July 1, 1958  W. L. AIKEN  2,841,128
CAGE FOR ENDWISE ASSEMBLY OF BALLS ON VALVE STEMS
Filed July 13, 1955

INVENTOR:
WILLIAM L. AIKEN
BY Howson & Howson
ATTYS.

United States Patent Office 2,841,128
Patented July 1, 1958

2,841,128

CAGE FOR ENDWISE ASSEMBLY OF BALLS ON VALVE STEMS

William L. Aiken, Philadelphia, Pa., assignor to SKF Industries, Inc., Philadelphia, Pa., a corporation of Delaware Application July 13, 1955, Serial No. 521,665

9 Claims. (Cl. 123—90)

This invention relates to cages for the rolling elements of anti-friction bearings, and a principal object of the invention is to provide a novel form of cage designed primarily to facilitate assembly of bearing balls on valve stems.

In reciprocating internal combustion engines, it has been found advantageous to afford the valves freedom for rotation during engine operation. Such rotation tends to distribute wear and temperature more uniformly over the valve and valve seat surfaces and tends to maintain efficient sealing contact between the valve and its seat for longer periods than where the valve, according to current almost universal practice, is prevented from rotating. In prior conventional practice, the valve springs which tend to hold the valves to their seats have been attached to the valve stems in such manner that valve rotation is effectively precluded. To afford freedom for rotation it has been proposed to introduce anti-friction bearing means between the springs and the stem to reduce to a practical minimum frictional retardation to rotation of the valve about the axis of the stem. To this same end it has been proposed to form the inner ball race of the bearing in the valve shank itself, not only as a measure of economy but also of space conservation. Assembly of the bearing balls in this race, however, has presented a difficult problem the solution of which constitutes a primary object of the present invention.

The invention contemplates provision of a cage of novel form capable of forming a stable unit assembly with the bearing balls highly adaptable for endwise assembly on the valve stem. The device of the invention thereby provides a simple and highly practical method for assembling the bearing balls in an inner race formed on the stem of the valve and for maintaining the balls in place for application thereto of an outer spring-supporting race element.

The invention will be more readily understood by reference to the attached drawings wherein.

Figure 4:
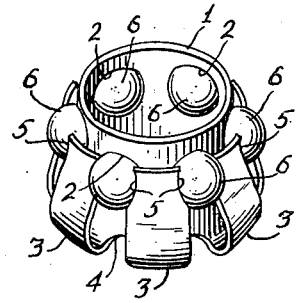
Fig. 4 is a view in perspective of the bearing ball and cage unit.
Figure 2:
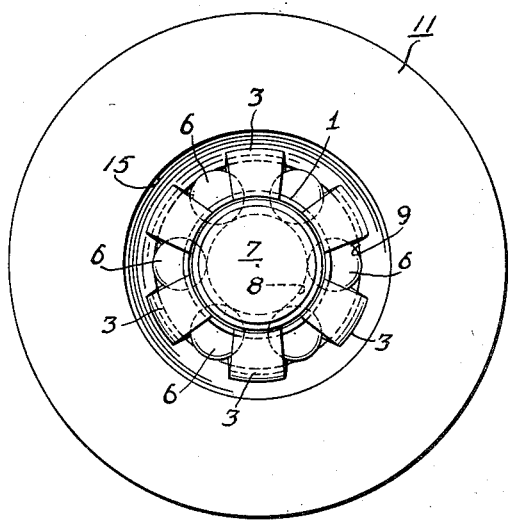
Fig. 2 is an inverted plan view of the assembly shown in Fig. 1.

With reference to the drawings, a cage made in accordance with my invention comprises an inner cylindrical or tubular body portion 1 having therein a circumferential series of apertures 2 which constitute pockets for the bearing balls. The cage comprises also a circumferential series of resilient ball-retaining fingers 3 which lie outwardly of and radially remote from the body member 1. In the embodiments of the invention illustrated in the drawings, the fingers 3 extend from one edge of the body portion 1, the lower edge 4 as viewed in Fig. 4, said fingers being turned back so as to extend generally in axial direction along the body member 1 and terminating in the general area of the upper ends of the apertures 2. Each of the fingers has at the opposite longitudinal edges thereof and adjacent its free end, a curved recess 5 which in assembly, as shown in Fig. 4, respectively engage the surfaces of the two bearing balls in the proximate pairs of pockets, the bearing balls being indicated generally by the reference numeral 6. The resilient fingers 3 thus serve to retain the balls 6 in the pockets 2, the said balls being of greater diameter than pocket apertures and being confined between the edges of the apertures and the edges of the recesses 5 of the resilient fingers 3. It is apparent that insertion of the balls 6 in the pockets 2 may be effected by simple outward flexure of the fingers 3, and that the balls are readily removable from the pockets in the same manner. When, after insertion of the balls in the pockets, the fingers are released so as to resiliently engage the balls, the balls and the cage become in effect a stable unit assembly which may be freely handled without danger of displacement of the balls from their pockets.

Figure 1:
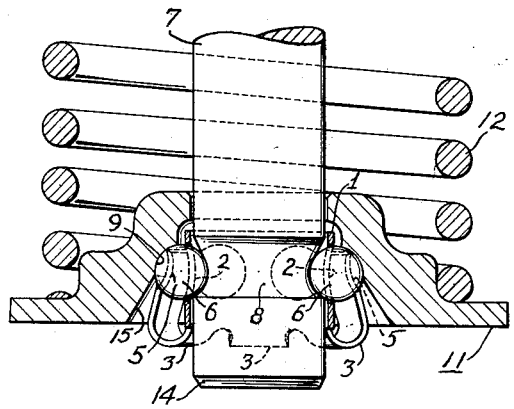
Fig. 1 is a fragmentary sectional view showing in essential part a valve spring and stem assembly including a ball bearing interposed between the spring and the stem and comprising a cage made in accordance with the invention.

As stated above, this cage and bearing ball unit assembly is adapted for endwise application to a valve stem having a circumferential groove constituting the inner race of the bearing. Such a stem is illustrated in Fig. 1 wherein it is identified by the reference numeral 7. The circumferential groove 8 adjacent the lower end of the stem constitutes the inner ball race of the bearing. By reference to Fig. 1 it will be noted that the cylindrical or tubular body portion 1 is only slightly larger in diameter than the stem 7 and fits freely on the latter, and when the cage and ball assembly occupies the position shown in Fig. 1, the balls 6 extend into contact with the curved surface of the race 8 with slight clearance with the edges of the socket apertures 2. When in this position, the fingers 3 operate to exert resilient radial pressure tending to hold the balls 6 in the race 8 so that the cage and ball unit forms a stable or subassembly with the valve stem.

The outer race of the bearing is formed by a circumferential or annular groove 9 in the inner face of a generally cup-shaped element 11, this element embracing the stem 7 above the row of balls 6 and forming a seat for a spring 12 the function of which is to maintain the valve head (not shown) on the upper end of the stem 7 on its seat except when periodically displaced by the conventional valve actuating devices. As illustrated in Fig. 1, the underside of the element 11 is formed to afford ample space below the race 9 for the lower relatively wide portion of the cage; and the upper ends of the arms 3 of the cage lie inwardly of the surface of the race 9, so that the element 11 is supported entirely and solely on the balls 6. It is evident that the valve stem 7 has freedom for rotation independently of the element 11 and that the frictional resistance to such relative rotation is reduced to the practical minimum by the inherent friction free properties of the ball bearing.

Figure 3:
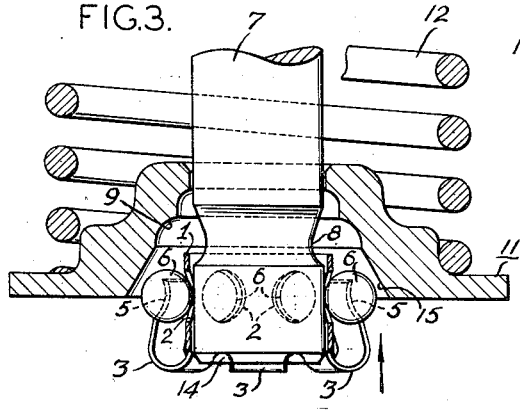
Fig. 3 is a fragmentary sectional view corresponding to Fig. 1 and illustrating the manner in which the cage and bearing ball unit is assembled with the valve stem.

The manner in which the cage functions in the operation of inserting the balls 6 of the bearing in the inner race 8 is illustrated in Fig. 3. In that view the inner tubular portion 1 of the cage-and-ball unit has been moved upwardly over the end of the stem 7. At the initiation of this movement the inner projecting sides of the balls 6 engage the bevelled extremity 14 of the valve stem and are cammed outwardly from the pocket apertures 2 against the resilient pressure of the fingers 3, the said fingers flexing outwardly as illustrated in Fig. 3 to permit passage of the balls onto the end of the stem. In this position the balls 6 are still maintained against displacement from the cage by the fingers 3 which confine the balls against displacement in all directions. Continued upward movement of the cage on the stem 7 results in engagement of the outer sides of the balls 6 with the conical or inwardly tapered surface 15 of the spring seat element 11, the effect being to force this element upwardly with contraction of the spring 12 to the extent necessary for admission of the balls 6 to the race groove 8. At this point, the balls will seat automatically in the outer groove 9 of the element 11 so that that element under action of the spring 12 will assume the position shown in Fig. 1 in which the assembly is complete. It is possible, of course, to introduce the balls 6 with the ball-retaining cage into the operative position shown in Fig. 1 without engagement of the balls 6 with the element 11 in the process of assembly, this being accomplished by displacing the element 11 upwardly against the action of the spring 12 to a position clear of the row of balls when the latter occupy the position shown in Fig. 1. Similarly, disassembly of the cage and ball unit from the stem is readily accomplished by first displacing the element 11 against the pressure of the spring 12 to an extent freeing the balls 6 from the race 9 and from contact with element 11, at which point a downward force applied to the cage will result in withdrawal of the balls 6 from the race 8 and movement of the unit downwardly over the end of the stem.

Figure 5:
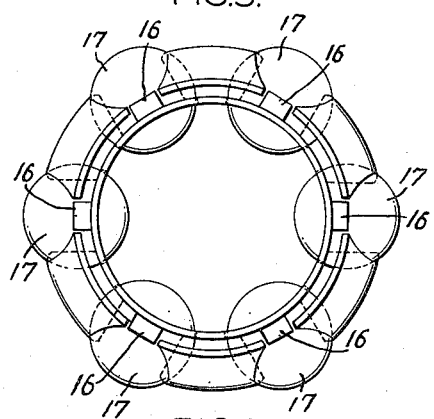
Fig. 5 is a top plan view of a slightly modified bearing ball and cage assembly made in accordance with the invention.
Figure 6:
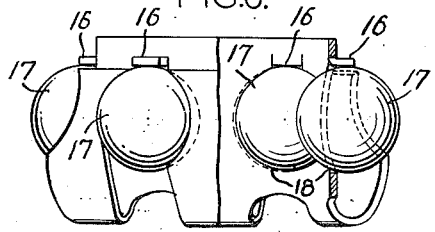
Fig. 6 is a side elevational view partly in section of the unit illustrated in Fig. 5.

A modification of the cage structure within the scope of the invention is illustrated in Figs. 5 and 6. In this case the cage has all of the elements of that previously described and illustrated in the preceding figures, but in this case tongues 16 have been pressed out of the material of the tubular inner portion 1 of the cage so as to immediately overlie the several balls 17 of the unit when the latter occupy the socket openings 18. The tongues 16 thus constitute positive stops to preclude possibility of displacement of the balls 17 from the cage in the axial direction under abnormal displacing pressure, and insure retention of the balls in the cage in the operation of disassembling the cage and ball unit from the valve stem as described above.

I claim:

1. In combination, a valve stem having a circumferential groove constituting a ball race, a ball cage embracing the stem, said cage comprising a cylindrical portion exceeding the diameter of the stem for free endwise assembly with the latter and having an annular series of apertures in registration with the said race, a bearing ball projecting through each aperture into rolling contact with the race surface, the diameter of the individual ball exceeding that of the said aperture, and radially displaceable resilient ball-retaining means engaging the outer sides of the balls and affording controlled radial displacement of the balls in said aperture equal at least to the radial depth of said groove, said retaining means forming with the apertured cylindrical portion and with the balls a self-contained unit for manipulation as such in said endwise assembly operation, the ball engaging portions of said retaining means being confined within a circle of lesser diameter than that circumscribing the annular series of balls and leaving the outer sides of the balls exposed for seating engagement with an annular outer ball race element.

2. The combination according to claim 1 including an outer ball race element in the form of a spring-seat supported on said balls.

3. In a self-contained ball bearing and cage assembly, a cage comprising an inner cylindrical body member having a circumferential series of apertures constituting ball pockets, balls in said pockets, said balls being of greater diameter than said apertures and projecting through the latter into the interior of the cylinder, and resilient means on the outer side of the body member engaging the balls and acting radially of the cylindrical axis of the body member to resiliently retain the balls in the pockets, said means being displaceable by flexure radially of the said axis of the body member to afford simultaneous displacement of the balls outwardly in the pockets.

4. An assembly according to claim 3 wherein the ball retaining means consist of a series of fingers joined to the body member by axially extended resilient loops.

5. An assembly according to claim 4 wherein the fingers lie between the respective adjoining pairs of pockets and each finger engages the confronting sides of the two balls in said pair of pockets.

6. A cage for self-contained ball bearing and cage assemblies, said cage comprising a generally tubular body member having in the wall thereof a circumferential series of apertures constituting ball pockets, and resilient ball-retaining fingers outwardly of and radially remote from said body member and joined to the body member by axially extended resilient loops, said loops affording the ball-retaining ends of the fingers freedom for movement with respect to the pockets in the said radial direction.

7. A cage according to claim 6 wherein the loops extend from an end edge of the body member.

8. A cage according to claim 7 wherein the terminal end portions of the fingers are provided with curved ball-engaging edges contoured in conformity with the spherical ball surfaces.

9. A cage according to claim 8 wherein each of the fingers has at the opposite edges thereof curved recesses for engagement respectively with the surfaces of two balls in adjoining pockets.

References Cited in the file of this patent

UNITED STATES PATENTS

| | | |
|---|---|---|
| 162,889 | Blaisse | May 4, 1875 |
| 180,961 | Thackara et al. | Aug. 8, 1876 |
| 1,080,081 | Sparks | Dec. 2, 1913 |
| 1,091,266 | Young | Mar. 24, 1914 |
| 1,170,899 | Hanus | Feb. 8, 1916 |
| 1,297,342 | Garlick | Mar. 18, 1919 |
| 1,618,851 | Thunberg et al. | Feb. 22, 1927 |
| 1,784,555 | Summers | Dec. 9, 1930 |
| 2,409,899 | Resina | Oct. 22, 1946 |
| 2,689,769 | Ware | Sept. 21, 1954 |

FOREIGN PATENTS

| | | |
|---|---|---|
| 40,664 | Sweden | Feb. 26, 1915 |